US006683271B2

(12) United States Patent
Rogers

(10) Patent No.: US 6,683,271 B2
(45) Date of Patent: Jan. 27, 2004

(54) VOLTAGE CONTROLLED ARC SPRAY

(76) Inventor: Frank S. Rogers, P.O. Box 780, Silverdale, WA (US) 98383

( * ) Notice: Subject to any disclaimer, the term of this patent is extended or adjusted under 35 U.S.C. 154(b) by 36 days.

(21) Appl. No.: 10/001,273

(22) Filed: Dec. 4, 2001

(65) Prior Publication Data

US 2003/0102295 A1 Jun. 5, 2003

(51) Int. Cl.[7] .................................................. B23K 9/04
(52) U.S. Cl. ................................ 219/76.14; 219/137.71
(58) Field of Search ......................... 219/137.71, 76.14, 219/124.03, 76.1, 137 R; 239/81, 84

(56) References Cited

U.S. PATENT DOCUMENTS

| | | | | |
|---|---|---|---|---|
| 2,669,640 A | * | 2/1954 | Outcalt et al. | 219/124.03 |
| 3,546,415 A | * | 12/1970 | Marantz | 219/76.14 |
| 4,246,463 A | * | 1/1981 | Shutt et al. | 219/137 R |
| 5,528,010 A | * | 6/1996 | Herwig et al. | 219/137.71 |
| 5,791,560 A | * | 8/1998 | Rogers et al. | 239/84 |

* cited by examiner

*Primary Examiner*—Clifford C. Shaw

(57) ABSTRACT

A process, whereas, the wire feed motor of the of twin wire arc spray process, receives its power from the same power circuit that creates the arc spray operation, thereby automatically changing the wire feed rate, as voltage changes occur in the spray process. Thereby maintaining a constant arc gap and consistent atomization to produce a uniform coating with no arc shorting. As the spray operation voltage decreases (attempting to close the wire gap) the wire feed decreases to maintain the wire gap. Conversely, when the voltage increases (attempting to open the wire gap) the wire feed increases to maintain the wire gap. Additionally, an automatic start up process is included in the present invention, a method is implored to reverse the wires at system start up to create a gap between the wires, this allows an arc to generate. With an arc established the feed direction is changed to forward and the spraying process continues, if start up should fail and wires again are touching, the reversing function will repeat until a steady arc is maintained.

3 Claims, 2 Drawing Sheets

VOLTAGE CONTROLLED ARC SPRAY

CROSS REFERENCE TO RELATED APPLICATIONS

None known to inventor.

This invention and research and development leading to this invention was not federally funded.

BACKGROUND

1. Field of Invention

This invention relates to using parallel electrical power from the same source to drive the wire feed motor and melt the spray wires, specifically the automatic wire gap adjustments that result.

2. Description of Prior Art

The twin wire arc thermal spray method (arc spray) feeds two wires into respective contact tips that pass electrical current into the wires. The tips are oriented toward each other so the wires extend toward an intersection. A high power is applied across the wires causing an electrical arc to form across the tips of the wires. The electrical current then melts the feed wire portion in the arc zone. A nozzle is located behind and between the contact tips and oriented to emit a gas stream toward the arc zone. The gas stream sprays the molten metal onto the work surface forming a coating. Prior art twin wire arc spray systems use electric drive motors, and use some type of motor control module to adjust voltage to the motor and therefore regulate speed of the motor, the feed motor power is independent of the spray arc power. The feeding of the two wires that are melted by the dc electric current, to make a coating, is the single most important part of the arc spray process. Prior art systems can malfunction due to voltage changes that occur in the spray voltage that are not compensated for in the wire feed system. Under normal operating condition the arc voltage may vary up to plus or minus 2 volt or more with no compensating change in wire feed rate. This is because, prior art systems spraying energy source, is independent (or isolated from), the wire feed motor energy source, therefore, as the arc voltage varies the wire feed rate remains the same. When the arc voltage decreases the wire gap closes and interferes with the gas flow between the wires, which can cause defect in the coating, or lead to system failure. Conversely, as the voltage increases the wire gap widens changing character of the gas flow, which will cause changes in the coating. A voltage increase is not as process damaging as a voltage decrease and usually does not causes a system failure, however it does make the process such that coating character can not be completely controlled. Additionally, prior art arc spray systems have a narrow window of spraying amperages and voltages that work for each type of wire being sprayed, limiting the ability to control the spraying process and the amount of material being sprayed. Also arc starting is a problem with prior art systems, generally the wires are left touching (shorted) at the end of a spray cycle. These wires require being cut to remove the shorted condition, or the process is started allowing the shorted wires to melt and therefore propelling large chunks of hot wire at whatever the gun is pointed at. One prior art system reverses the wires at the end of the spray cycle to create a gap between the wires, if the spray cycle fails to start and the wires become shorted the system must be turned off for the wires to again retract. Teachings of the present invention shows a new method of arc starting and means to precisely control the wire gap between the two wires as the spraying process is active.

OBJECTS AND ADVANTAGES

This invention is a more, effective, economical, and simple method to produce an arc sprayed coating.

Still another object of the present invention is to provide a method to power the wire feed motor with parallel electrical energy used to melt the spray wires, this enables the wire feed motor speed rate to change as the voltage of the spray process changes. The motor speed will increase, as the spray process voltage increases and the motor speed will decrease, as the spray process voltage decreases, thereby controlling the gap between the wires and holding it at a near constant distant.

Still another object of the present invention is to provide a process to power the wire feed motor with parallel electrical energy used to melt the spray wires, this enables the wire feed motor speed rate to change as the voltage of the spray process changes. The motor speed will increase, as the spray process voltage increases and the motor speed will decrease, as the spray process voltage decreases, thereby controlling the gap between the wires and holding it at a near constant distant.

Still another object of the present invention is to provide an unobstructed wire gap for uniform atomization of the molten metal.

Still another object of the present invention is to provide a method for preventing wire shorting which can leads to equipment failure and shut down.

Still another object of the present invention is to provide a method that allows a wide range of spray rate settings for operations and deposit control.

Still another object of the present invention is to provide a method to part the wires during start up of a spray cycle to establish an arc.

Still another object of the present invention is to provide an automatic start up sequence whereas the wire (if touching) will retract to form a gap in the wire then proceed forward to begin the spray cycle.

Still another object of the present invention is to provide a method of repeating the automatic start up sequence until the spraying operation begins.

DRAWING FIGURES

REFERENCE NUMERALS IN DRAWINGS

Figure 1:
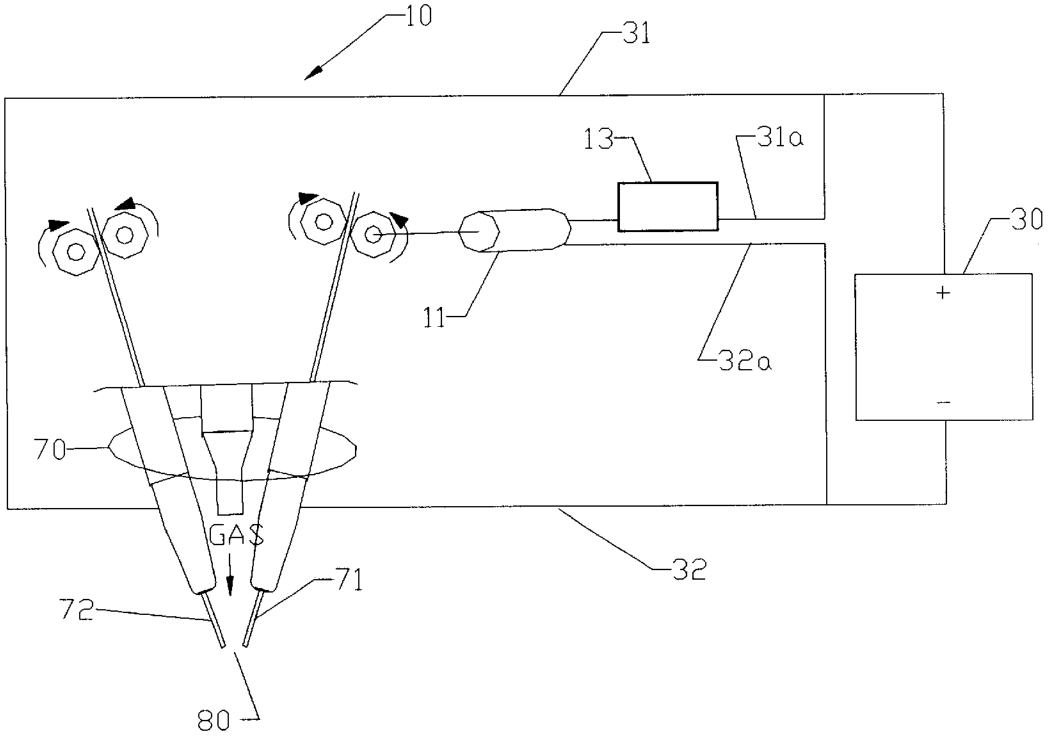
FIG. 1 is a schematic of arc spray apparatus

10 twin wire arc spray system
11 dc wire feed motor
13 variable resistor
15 trigger switch
18 relay switch
18*a* relay coil
19 gas valve
20 reverse flow secondary dc power
30 dc power supply
31 positive lead
31*a* branch positive lead
32 negative lead
32*a* branch negative lead
70 spray head
71 negative spray wire
72 positive spray wire
80 wire gap

SUMMARY

The present invention teaches a process to maintain the wire gap of a twin wire arc spray method by using the same electrical power to drive the wire drive motor that is used to melt the spray wires, thereby improving coating quality, simplifying the motor drive speed controls, and improving reliability.

Figure 2:
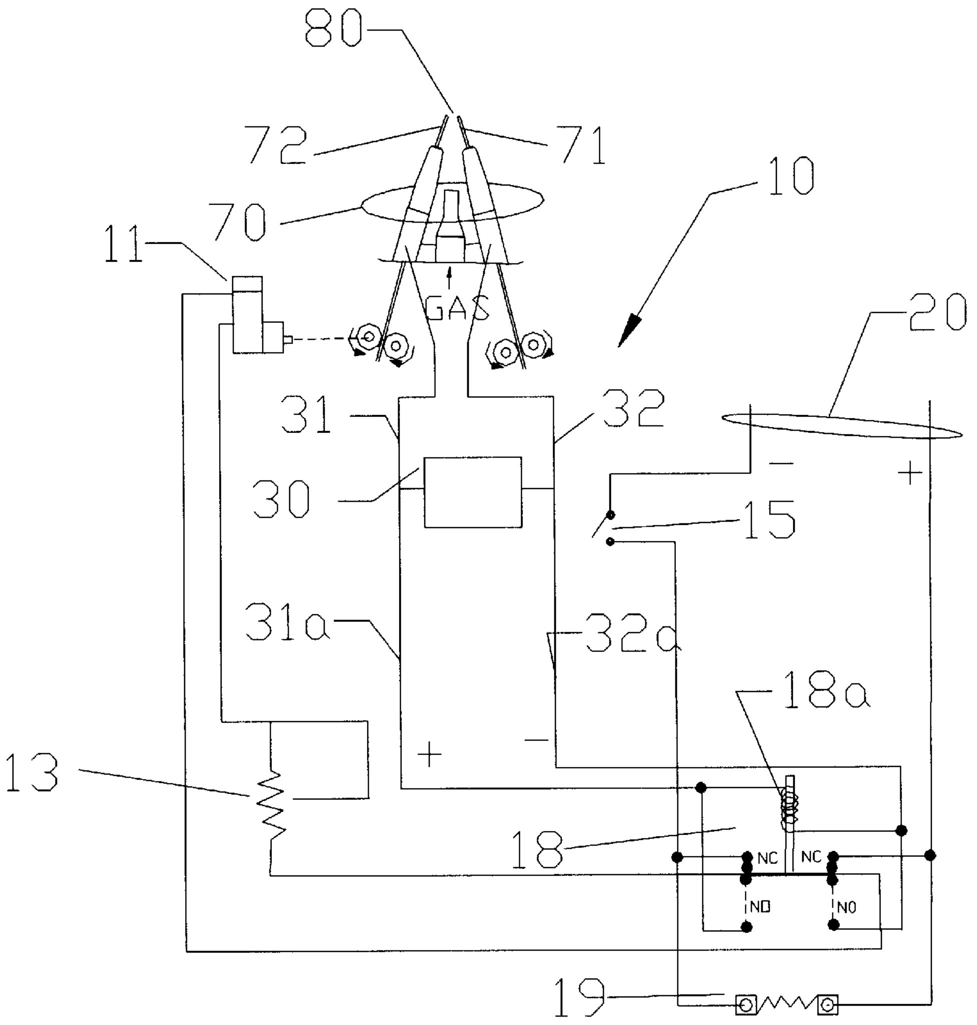
FIG. 2 is an electrical schematic of components

Looking now at FIG. 1, a schematic of the present invention 10. Power supply 30 provides electrical power to positive spray wire 72 and negative spray wire 71 through positive circuit 31 and negative circuit 32. The dc wire feed motor 11 is provided electrical power through positive branch circuit 31*a* and negative branch circuit 32*a*. The electrical power traveling circuit 31*a* is routed through variable resistor 13 on route to dc wire feed motor 11. The speed of dc wire feed motor 11 is adjusted by changing the voltage applied to the motor windings by means of variable resistor 13. The dc power supply 30 is a commercial product available from numerous manufacturers, it would be recognized as a dc welding power supply. The dc power supply 30 contains means to adjust the power level output so that voltage can be set to a desirable level to perform the thermal arc spray process. Recognizing that both the dc wire feed motor 11 and spray wires 71 and 72 are paralleled connected on the same wiring circuit from power supply 30 via positive lead 31 and branch positive lead 31*a* and negative lead 32 and branch negative lead 32*a*. Therefore a change in voltage of the spray process will effect a change in speed of dc wire feed motor 11. Therefore the speed of dc wire feed motor 11 automatically changes to maintain wire gap 80 at a constant distance between the melting wires. Many conditions of the process can cause dc power supply 30 to change voltage output, in prior art, the smallest decrease in voltage will cause the wire gap to close, the smallest voltage increase will open the wire gap. The present invention automatically changes the speed of dc wire feed motor 11 to sustain a steady unchanging wire gap 80. A decrease in voltage will also decrease speed of dc wire feed motor 11 and wire gap 80 will remain unchanged. Conversely an increase in voltage will cause an increase speed of dc wire feed motor 11 and hold wire gap 80 constant. Wire shorting is eliminated with the present invention, as the gap attempts to close between the wires the voltage decreases, as the voltage decreases the speed of the motor decreases, therefore the motor will stop prior to reaching zero voltage therefore a gap will remain between the spray wires at all voltages. Looking now at FIG. 2, electrical schematic of arc spray system 10, will teach of the automatic starting process of the present invention. Assume negative spray wire 71 and positive spray wire 72 are touching, and trigger switch 15 is actuated to start the spray process. Trigger switch 15 also turns on gas valve 19 to allow atomization gas to flow into the spray head. At this time, current is not flowing to relay coil 18*a* and relay switch 18 is in the normally closed state, therefore reverse flow secondary dc power 20 flows through variable resistor 13 to dc wire feed motor 11. The motor is now running in the reverse direction causing spray wires 71 and 72 to separate. Upon wire separation, an arc is established between these two spray wires, at that instance voltage exist and power flows to relay coil 18*a,* actuating relay switch 18. This transfers the power driving dc wire feed motor 30, from reverse flow secondary power 20, to forward flow dc power supply 30, this drives the wires forward which continues as the wire melt, maintaining the spray operation. Now assume the spray process fails to start or continue spraying and spray wires 71 and 72 are again touching, trigger switch 15 is still in the actuated state. Current is flowing to the wires from dc power supply 30, however there is no voltage flow because the spray wires are touching. Therefore relay coil 18*a* is de-energized allowing relay switch 18 to supply reverse flow secondary dc power 20 to dc wire feed motor 11 causing it to run in reverse, again creating a gap between the spray wires, at the moment voltage flows to the relay coil 18*a* it actuates relay switch 18. This transfers voltage from the reverse flow secondary dc power 20 to forward flow voltage from dc power supply 30, driving the spray wires forward to maintain the spray arc. This start up process will continue until the spraying process starts.

CONCLUSIONS, RAMIFICATIONS, AND SCOPE

Accordingly, the reader will see the present invention to be the process of providing the means to maintain a constant arc gap between the spray wires while eliminating wire shorting for the twin wire arc spray process by using the same power for the wire drive motor that is used for the arc spray process. The speed of the wire feed motor automatically changes as voltage changes occur in the spray arc resulting in unexpected process improvements which are summarized below.

It provides a coating that is more uniform in coating character,

It provides a constant gap between the spray wires,

It provides for more effective and uniform atomization,

It provides a more economical method of controlling the speed of the wire feed motor, It provides a simplistic method of motor speed control improving reliability, It provides a more effective method in that the motor speed control is a direct link to the arc voltage, It eliminated wire shorting during process operations, It provides a method of automatically gaping the spray wires at process start up to eliminate wire clipping and system shut down for restarts, It provides a means to spray at a wide range of spray rates to control coating character.

Although the description above contains specificities, these should not be construed as limiting the scope of the invention but as merely providing illustrations of some of the presently preferred embodiments of this invention. For example other means to regulate wire feed motor speed, based on the arc voltage reading, is conceivable.

I claim:

1. A process for arc spraying comprising the steps of;

providing common power for the arc spray process and wire feed motor, means to change said power to wire feed motor as power changes occur in the arc spray process, whereby, the power to the wire feed motor can be regulated to obtain a desired speed that will change as power changes occur in spray process.

2. The process of claim 1 wherein the said power to the wire feed motor is provided with a parallel electrical circuit that is used to melts the spray wires.

3. The process of claim 2 wherein the said wire feed motor speed rate is controlled by regulating voltage supplied to the wire feed motor.

* * * * *